Reissued May 25, 1937 Re. 20,383

UNITED STATES PATENT OFFICE 20,383

FILM FORMING COMPOSITIONS AND PROCESS FOR MANUFACTURING SAME

Kurt Ripper, Berlin, Germany, assignor, by mesne assignments, to American Cyanamid Company, a corporation of Maine No Drawing. Original application March 20, 1924, Serial No. 700,736. Patent No. 1,734,693, dated November 5, 1929. Divided and application June 22, 1925, Serial No. 38,920. Application for reissue November 4, 1931, Serial No. 573,033. In Austria March 31, 1923

10 Claims. (Cl. 134—26)

This invention relates to the manufacture of lacquers, films and the like from certain novel condensation products of urea or its derivatives with formaldehyde, and to lacquer compositions thus prepared.

The present application is a division of my copending application Serial No. 700,736, filed March 20, 1924, Patent No. 1,687,312, dated Oct. 9, 1928, for a process for manufacturing such novel water clear urea-formaldehyde condensation products.

The present invention relates to the manufacture of non-aqueous lacquers from such novel condensation products, namely, the products obtained by conducting the first stage of the reaction between a urea and formaldehyde, wherein the viscous initial products are formed in two essential phases, the first in the absence of free hydrogen ions and the second in the presence of free hydrogen ions. This is accomplished by adjusting the $C_h$ in the first phase, which is completed after applying heat for a short period of time, to a value of about $10^{-7}$ or below, and by adjusting the $C_h$ in the second phase to a value upwards of $10^{-7}$ but not reaching $10^{-3}$, and continuing the reaction is continued by further heating. The symbol $C_h$ represents usually grammes of hydrogen ions per liter.

The hydrogen ion concentration may also be expressed by the symbol pH (chosen by Sorensen) representing—log H. Therefore the value $C_h=10^{-7}$ corresponds to the value pH=7, the value $C_h=10^{-3}$ to the value pH=3.

This mode of conducting the polymerization process in an acid medium results in the formation of a hydrophobe emulsion colloid which had been unknown heretofore. If the condensation product formed by short heating of the mixture of urea and formaldehyde is heated for prolonged time or if the concentration of the hydrogen ions is increased above a certain limit, this hydrophobe emulsion colloid is precipitated by cooling the reaction mass after accomplishment of the polymerization process.

I have found that the hydrophobe gel thus produced is far more suitable than any other reaction product of this kind for manufacturing lacquers or films and that the said hydrophobe product may be used with non-aqueous solvents and non-aqueous tempering agents to make lacquers, even when such solvents are not miscible with water. This result is of importance, because there are no tempering agents for lacquers soluble in water, and because lacquers made without such additions have the disadvantage of easily cracking in the warmth.

*Example*

30 parts by weight of pure and neutrally reacting urea are mixed with 100 parts by weight of a 30% aqueous solution of formaldehyde which is free from acid or is neutralized or is slightly alkaline, the mixture being heated to boiling in a boiler with a reflux condenser. After short boiling 5 parts by weight of boric acid, dissolved in a little water, are added thereto; the whole mixture is thereafter further boiled in the boiler with the reflux condenser for 6 or 7 hours. After being allowed to stand in the cold for several hours, the mass is found to be divided in two layers, of which the upper one is poured off, whereafter the tough gel forming the lower layer is repeatedly washed with water. The gel thus produced can be dissolved in non-aqueous solvents, such as for instance epichlorhydrin. Mixed with softening agents this lacquer solution yields a non-cracking coating of lacquer, which is completely insensitive to any action of water.

I claim—

1. The process of producing film-forming solutions which consists in reacting on a urea with a solution of formaldehyde by boiling the mixture adjusted to a $C_h$ not exceeding $10^{-7}$ for a short time, thereafter adjusting the hydrogen ion concentration of the reaction mixture to a value upwards of a $C_h$ of $10^{-7}$ to cause complete conversion of the first formed hydrophile emulsion colloid in a hydrophobe colloid on further heating, continuing the reaction by heating the reaction mixture, cooling the reaction product whereby the hydrophobe colloid is precipitated therefrom, separating the precipitated colloid from the water and dissolving it in a non-aqueous solvent.

2. The process of producing film-forming solutions which consists in reacting on a urea with a solution of formaldehyde free of acid, initiating the reaction by boiling the mixture for a short time, thereafter adjusting the hydrogen ion concentration of the reaction mixture to a value upwards of a $C_h$ of $10^{-7}$ by addition of acid-reacting agents to cause complete conversion of the first formed hydrophile emulsion colloid in a hydrophobe colloid on further heating, continuing the reaction by heating the reaction mixture, cooling the reaction product whereby the hydrophobe colloid is precipitated, separating the precipitated colloid from the water and dissolving it in a nonaqueous solvent.

3. The process of producing film-forming solutions which consists in reacting on a urea with a solution of formaldehyde, the free formic acid content of which solution had been eliminated before starting the reaction, initiating the reaction by boiling the mixture for a short time, adjusting the hydrogen ion concentration in the reaction mixture by addition of acid-reacting agents to a value upwards of a $C_h$ of $10^{-7}$ to cause complete conversion of the first formed hydrophile emulsion colloid in a hydrophobe colloid on further heating, continuing the reaction by heating the reaction mixture, cooling the reaction product whereby the hydrophobe colloid is precipitated therefrom, separating the precipitated colloid from the water, and dissolving it in a non-aqueous solvent.

4. The process of producing film-forming solutions which consists in reacting on a urea with a solution of formaldehyde, the free formic acid content of which solution has been neutralized before starting the reaction, initiating the reaction by boiling the mixture for a short time, adjusting the hydrogen ion concentration of the reaction mixture to a value upwards of a $C_h$ of $10^{-7}$ to cause complete conversion of the first formed hydrophile emulsion colloid in a hydrophobe colloid on further heating, continuing the reaction by heating the reaction mixture, cooling the reaction product whereby the hydrophobe colloid is precipitated therefrom, separating the precipitated colloid from the water, dissolving it in a nonaqueous solvent and adding a tempering agent.

5. The process of producing film-forming solutions which consists in reacting on a urea with a solution of formaldehyde, the free formic acid content of which solution had been neutralized before starting the reaction, initiating the reaction by boiling the mixture for a short time, adjusting the hydrogen ion concentration in the reaction mixture to a value upwards of a $C_h$ of $10^{-7}$ to cause complete conversion of the first formed hydrophile emulsion colloid in a hydrophobe colloid on further heating, continuing the reaction by further heating the reaction mixture, cooling the reaction product whereat the hydrophobe colloid is precipitated therefrom, separating the precipitated colloid from the water, dissolving it in non-aqueous solvents and adding tempering agents, having the property of preventing the films formed by evaporation of the solutions from cracking.

6. A composition comprising a solution of a urea-formaldehyde condensation product in a non-aqueous solvent, said solution containing a tempering agent.

7. A non-aqueous lacquer solution containing a urea-formaldehyde condensation product.

8. A non-aqueous lacquer solution containing a urea-formaldehyde condensation product and a softening agent.

9. A composition comprising a urea-formaldehyde condensation product and chlorhydrin.

10. A lacquer composition comprising a hydrophobe reaction product of urea and formaldehyde, soluble and dissolved in a non-aqueous solvent. soluble and dissolved in a non-aqueous organic solvent.

KURT RIPPER.

CERTIFICATE OF CORRECTION.

Reissue No. 20,383. May 25, 1937.

KURT RIPPER.

It is hereby certified that error appears in the printed specification of the above numbered patent requiring correction as follows: Page 2, first column, line 21, claim 4, for the word "has" read had; and second column, line 31, claim 10, strike out the words and period "soluble and dissolved in a non-aqueous solvent."; and that the said Letters Patent should be read with these corrections therein that the same may conform to the record of the case in the Patent Office.

Signed and sealed this 27th day of July, A. D. 1937.

Henry Van Arsdale (Seal) Acting Commissioner of Patents.